(12) United States Patent
Kolluri Venkata Sesha et al.

(10) Patent No.: US 11,010,567 B2
(45) Date of Patent: May 18, 2021

(54) ENABLING SPONSORED SOLUTIONS FOR TECHNICAL INSTRUCTION AUGMENTATION

(71) Applicant: International Business Machines Corporation, Armonk, NY (US)

(72) Inventors: Saiprasad Kolluri Venkata Sesha, Bengaluru (IN); Sougata Mukherjea, New Delhi (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/126,674

(22) Filed: Sep. 10, 2018

(65) Prior Publication Data

US 2020/0081984 A1    Mar. 12, 2020

(51) Int. Cl.
*G06F 40/40*      (2020.01)
*G06F 3/0482*     (2013.01)
*G06Q 30/08*      (2012.01)
*G06F 16/951*     (2019.01)
*G06F 16/9038*    (2019.01)
*G06F 16/9032*    (2019.01)

(52) U.S. Cl.
CPC ............ *G06F 40/40* (2020.01); *G06F 3/0482* (2013.01); *G06F 16/9038* (2019.01); *G06F 16/90332* (2019.01); *G06F 16/951* (2019.01); *G06Q 30/08* (2013.01)

(58) Field of Classification Search
CPC .......... G06F 16/9038; G06F 16/90332; G06F 16/951; G06F 40/40; G06Q 30/08
USPC ........................................................ 707/758
See application file for complete search history.

(56) References Cited

U.S. PATENT DOCUMENTS

| 2011/0078105 A1 | 3/2011 | Wallace |
| 2014/0201125 A1 | 7/2014 | Moeinifar et al. |
| 2014/0358680 A1 | 12/2014 | Jones |

OTHER PUBLICATIONS

Draft NIST Working Definition of Cloud Computing by Peter Mell and Tim Grance, dated Oct. 7, 2009, 7 pages.

*Primary Examiner* — Robert W Beausoliel, Jr.
*Assistant Examiner* — Pedro J Santos
(74) *Attorney, Agent, or Firm* — Patterson + Sheridan, LLP

(57) ABSTRACT

Techniques for augmenting technical instruction sets with additional solutions from solution providers are described. A user query for technical instruction comprising a technical problem to solve is received and a current user state from data representing user knowledge and available physical resources is determined from the user. Additionally, a technical instruction set is identified and an augmented technical instruction set comprising additional technical instructions from a winner of a knowledge augmentation auction is generated and returned.

20 Claims, 10 Drawing Sheets

US 11,010,567 B2

ENABLING SPONSORED SOLUTIONS FOR TECHNICAL INSTRUCTION AUGMENTATION

BACKGROUND

The present disclosure relates to providing enhanced or augmented technical instructions to a user, and more specifically, to providing technical instructions to a user incorporating solutions from a winner of a knowledge augmentation auction.

Current implementations to obtain technical solutions require a user to manually consult technical information. This can include users searching through physical copies of technical manuals and/or other's notes on how to implement solutions. Often users must consult directly with a coworker or other users to try and discern an appropriate solution to technical problems. With the advent of online forums and other networked databased users can utilize search functions to sort through solution databases. However, these searches only provide technical information based on keywords or other search parameters and can often leave the user reviewing large amounts of irrelevant or redundant material. Narrowing searches to specific solutions related to a user's problems consumes large amounts of time and resources.

In some cases, these methods provide a user general technical information about a problem the user may want to solve, but it does not provide specific solution related to the user and the resources the user has available to them. This can again lead to a user reviewing generic material and instructions multiple times without advancing in the solution. Current implementations also fail to allow a provider of solutions to target users who may benefit from implementing the provider's solution.

SUMMARY

One embodiment described herein provides a method. The method includes receiving, at an augmented technical instruction system, a user query for technical instruction comprising a technical problem to solve from a user device, and determining a current user state from state data received at the augmented technical instruction system, the state data representing user knowledge and available physical resources. The method continues by identifying a technical instruction set, from the user query and the current user state, generating, at the augmented technical instruction system, an augmented technical instruction set comprising additional technical instructions provided from a winner of a knowledge augmentation auction, and returning the augmented technical instruction set to the user device, responsive to receiving the user query from the user device.

Another embodiment described herein provides a system. The system includes one or more computer processors and a memory containing a program which when executed by the processors performs an operation. The operation includes receiving, at an augmented technical instruction system, a user query for technical instruction comprising a technical problem to solve from a user device, and determining a current user state from state data received at the augmented technical instruction system, the state data representing user knowledge and available physical resources. The operation continues by identifying a technical instruction set, from the user query and the current user state, generating, at the augmented technical instruction system, an augmented technical instruction set comprising additional technical instructions provided from a winner of a knowledge augmentation auction, and returning the augmented technical instruction set to the user device, responsive to receiving the user query from the user device.

Another embodiment described herein provides a computer program product. The computer program product includes a computer-readable storage medium having computer-readable program code embodied therewith, the computer-readable program code executable by one or more computer processors to perform an operation. The operation includes receiving, at an augmented technical instruction system, a user query for technical instruction comprising a technical problem to solve from a user device, and determining a current user state from state data received at the augmented technical instruction system, the state data representing user knowledge and available physical resources. The operation continues by identifying a technical instruction set, from the user query and the current user state, generating, at the augmented technical instruction system, an augmented technical instruction set comprising additional technical instructions provided from a winner of a knowledge augmentation auction, and returning the augmented technical instruction set to the user device, responsive to receiving the user query from the user device.

DETAILED DESCRIPTION

Most information technology (IT) service/solution providers are not automated processes and instead the installation, deployment, and maintenance of IT solutions requires high levels of manual and mental labor from IT engineers/technicians. During this process the IT engineers often consult documentation (e.g., user manuals and guides) and sources of technical help (e.g., knowledge bases, online web searches, chatbot based assistance programs, etc.) For example, in a distributed application deployed on a cloud infrastructure, there may be times when an IT engineer needs to prepare the application for increased resource augmentation to handle a higher load capacity. While the act of resource augmentation on a cloud-deployed application comes at one-click on a user interface, a lot of preplanning is required to set up to the infrastructure by which that single click can be made, (i.e. an IT engineer performs intensive preparatory work in the background). This preparatory work may include acquiring hardware, designing a solution to incorporate the hardware, and implementing the designed solution. The largest part of the IT engineer's labor is invested in the design phase of the preparatory work, where much of the time is dedicated towards reading/consulting technical materials, such as instruction manuals, and identifying the pros and cons for each design/solution choice. The significant volume of user technical materials available complicates the design process and increasingly adds costs to users attempting to consult and apply the solutions described in the technical materials. In some examples, user interface mechanisms (e.g., chatbots), along with other knowledge sharing facilities, help IT engineers (users) in an interactive understanding process, but these examples still require a user to sort through lower quality solutions in the design process.

The system and methods described herein, provide augmented technical instructions that include higher quality and focused solution sponsoring for augmenting user instructions for IT service/solution designers, by means of creating selective solution auctions, and choosing solutions from solution providers to include in a set of augmented technical instructions from the auction winners.

Figure 1:
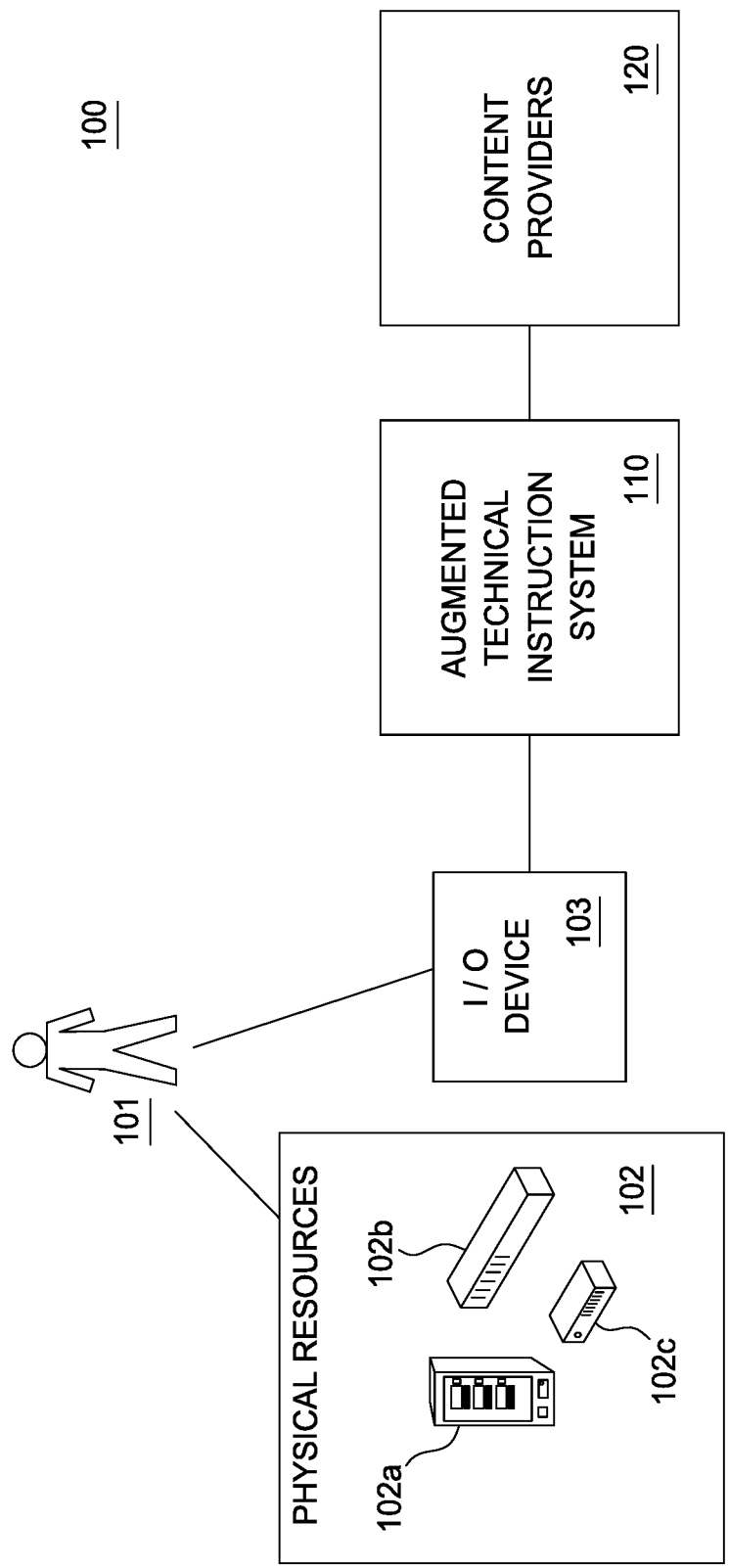
FIG. 1 depicts a system for providing augmented technical instructions to a user, according to one embodiment described herein.

Turning now to FIG. 1, which depicts a system for providing augmented technical instructions to a user, according to one embodiment. As shown, the environment 100 may include a user 101 (e.g. an IT technician, engineer, and/or IT service/solution designer) where the user 101 may have a set of available physical resources (resources 102) which includes hardware and other resources intended to help the user 101 with a technical problem to solve. For example, resources 102 may include a server 102a, a networking device 102b and/or a network switch 102c. In some examples, the technical problem to solve may include a design solution to incorporate the resources 102 into a computing infrastructure to provide increased functionality to a distributed application. The user may interact with an augmented technical instruction system 110 using an Input/Output (I/O) device (I/O device 103). I/O device 103 may include any device with an interactive user interface including a personal computer, mobile device, tablet, smart phone, etc. As shown, the system 110 is communicatively connected to solution providers 120, which may be solicited for and/or provide solution bids to augment a list of technical instructions. Solution providers may include IT solution providers that may provide solution bids to augment the technical instructions on how to implement a solution for the technical problem to solve for a given set of resources such as resources 102. Solution providers 120 may include IBM®, Amazon®, Microsoft®, and many other companies and/or entities that provide IT solutions.

Figure 2A:
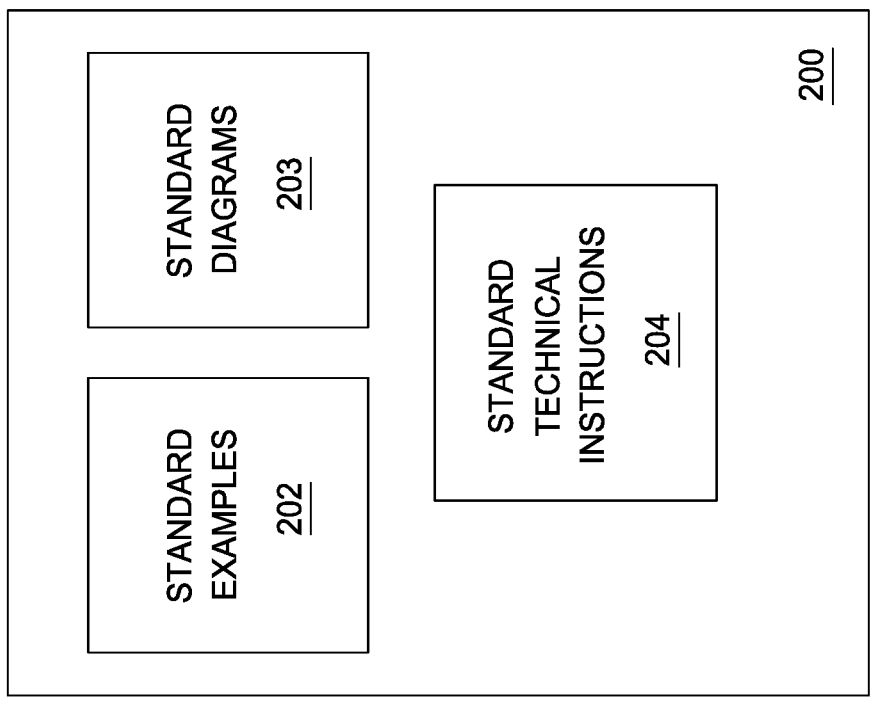
FIG. 2A depicts an example standard technical instruction set, according to one embodiment described herein.

In one example, the system 110 identifies a need for a design solution, when the user 101 interacts with an automated support agent (chatbot) which may be hosted by system 110 and accessed by the user 101 through I/O device 103. The user 101's interactions with the chatbot may be for seeking help in developing the design of a technical solution, i.e. the technical problem to solve. In some examples, as described herein, the system 110 infers a known or current state of the user, by performing identification of entities (e.g., resources 102, etc.) that are a component of or used in a design solution. This identification may be accomplished by searching what the user 101 has discussed with the system 110 (e.g., using the chatbot) in the current session or the recent past. In some embodiments, the system 110 may infer a known state of the user, by inspecting the set of instruction manuals that the user has consulted using the system 110, in the recent past, that are aligned to the current topic of discussion. In one embodiment, the system 110 obtains a known or current state of the user by actively asking or querying the user in order to derive the current state, and receiving/parsing a structured or unstructured response through the I/O device 103. The system 110 may also identify an initial or potential set of examples, from the user manuals and other metadata available in the system 110 that can be compiled as a technical instruction set and displayed to the user through the I/O device 103, prior to an augmentation of the technical instruction set. For example, as shown in FIG. 2A, which depicts an example standard technical instruction 200, the standard technical instruction set 200 may include standard examples 202, standard diagrams 203, and standard technical instructions 204, each determined and compiled by system 110 as the initial, generic, and/or potential set of examples from stored user manuals and other knowledge databases. The standard technical instruction set 200 may provide the user with a better understanding of a design solution prior to augmentation of the technical instruction set.

Figure 2B:
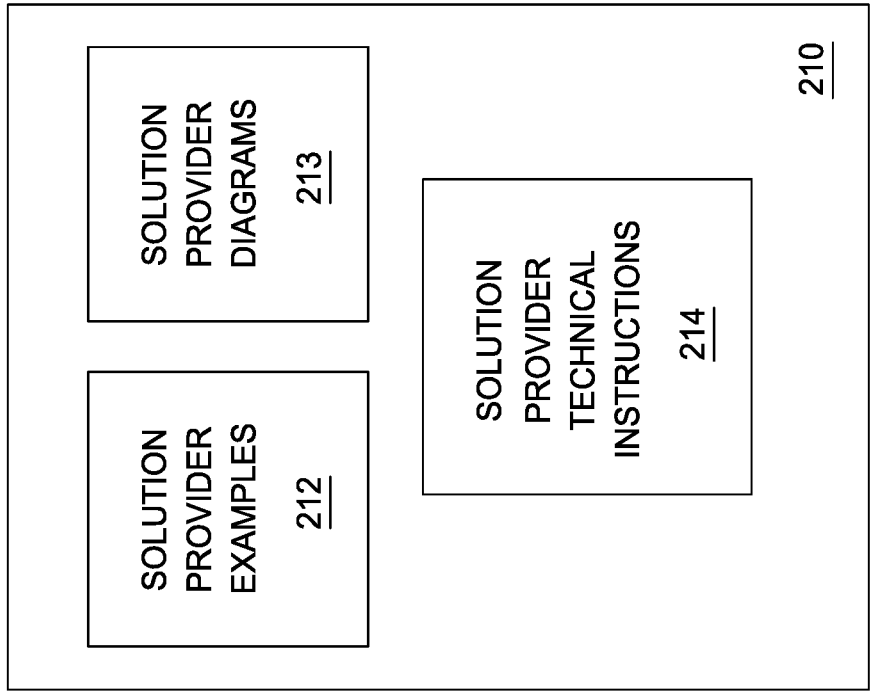
FIG. 2B depicts an example solution bid, according to one embodiment described herein.

In some examples, the system 110 also identifies a remainder of the design solution that the user needs to implement, by examining the solution goal or technical problem to solve and the current state of the user. In some examples, system 110 identifies a set of competing solution providers among the solution providers 120 that may have additional solutions, such as instructions/examples etc., to implement the remainder of the solution. In some examples, system 110 is configured to conduct a real-time auction by soliciting bids from solution providers 120 (described in more detail in relation to FIGS. 3 and 6), and identifying an auction winner and/or winners from among the solution providers 120, along with resources/resource types that the auction winner will display using the I/O device 103. For example, as shown in FIG. 2B, the solution providers 120 may provide a solution bid 210 including solution provider examples 212, solution provider diagrams 213, and solution provider technical instructions 214.

Figure 2C:
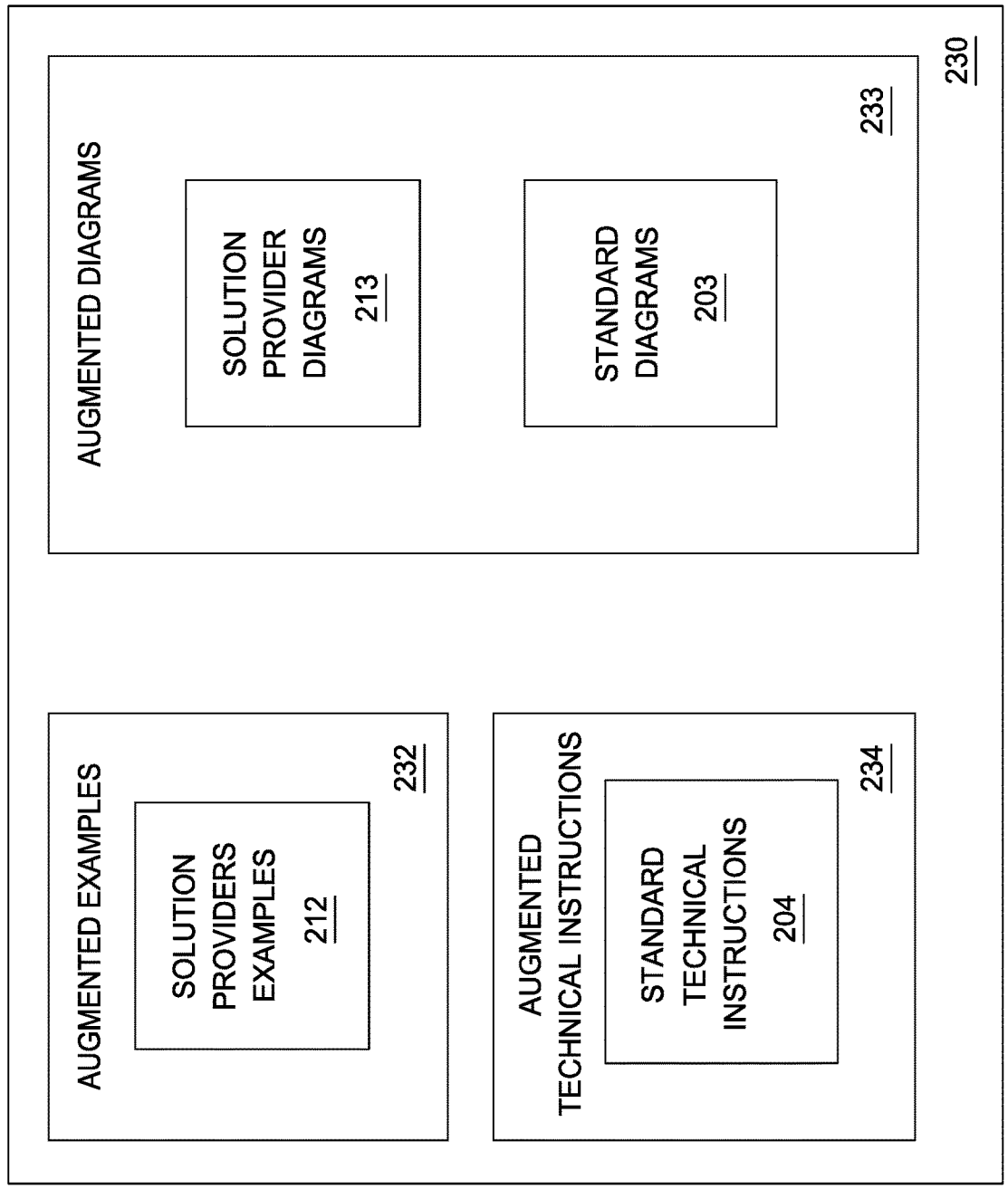
FIG. 2C depicts an example augmented technical instruction set, according to one embodiment described herein.

In some examples, system 110 then generates an augmented technical set such as the augmented technical instruction set 230 shown in FIG. 2C. As shown, augmented technical instruction set may incorporate components of both the standard technical instruction set 200 and a winning solution bid 210. In some examples, the solution bid 210 may replace the entire set of standard technical instruction set in the augmented technical instruction set 230. In some examples, system 110 also constructs concrete examples in the augmented instructions, using the solution provided by the winner of the auction (as determined by a knowledge base or further queries made to the auction winner), for providing to the user, and providing these concrete examples back to the auction winner among the solution providers 120. The system 110 may also store the concrete examples and the augmented instruction set for future use.

Figure 3:
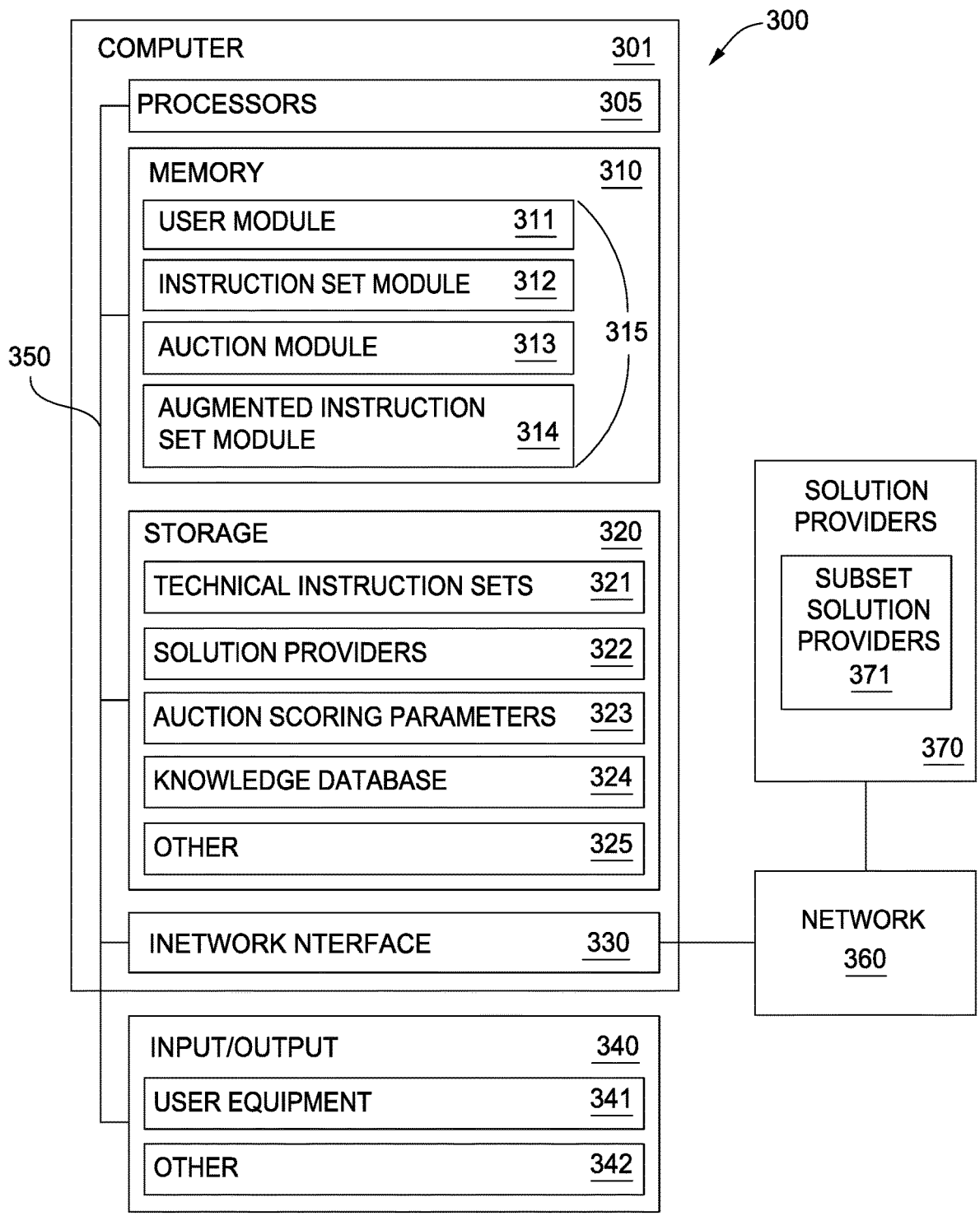
FIG. 3 is a block diagram of a server to facilitate technical instruction augmentation, according to one embodiment described herein.

Turning now to FIG. 3 which depicts a block diagram of a server to facilitate technical instruction augmentation, according to one embodiment. FIG. 3 is a block diagram of a server, such as a server embodying system 110, to facilitate technical instruction augmentation, according to one embodiment. As shown in FIG. 3, the arrangement 300 may include computer 301 configured to execute the various functions of the system 110 described herein. The computer 301 is shown in the form of a general-purpose computing device. The components of computer 301 may include, but are not limited to, one or more processors (or processing units) 305, a system memory 310, a storage system 320, network interface 330 connecting the computer 301 to network 360 and, in turn, solution providers 370, and a bus 350 that couples various system components including the system memory 310 and storage system 320 to processors 305 along with various input/output components 340. In other embodiments, arrangement 300 is distributed and includes a plurality of discrete computing devices that are connected through wired or wireless networking. In some examples, arrangement 300 may be embodied on a cloud implementation as described in relation to FIGS. 9 and 10.

Bus 350 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 301 typically includes a variety of computer system readable media. Such media may be any available media that is accessible by computer 301, and it includes both volatile and non-volatile media, removable and non-removable media.

System memory 310 can include computer system readable media in the form of volatile memory, such as random access memory (RAM) and/or cache memory. Computer 301 may further include other removable/non-removable, volatile/non-volatile computer system storage media. By way of example, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 350 by one or more data media interfaces. As will be further depicted and described below, memory 310 may include at least one program product having a set (e.g., at least one) of program modules that are configured to carry out the functions of various embodiments described herein.

Computer 301 may further include other removable/non-removable, volatile/non-volatile computer system storage media. In some examples storage system 320 may be included as part of memory 310 and may typically provide a non-volatile memory for the networked computing devices, and may include one or more different storage elements such as Flash memory, a hard disk drive, a solid state drive, an optical storage device, and/or a magnetic storage device. For example, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. Storage 320 may include media for storing technical instruction sets 321, a list of solution providers 322, auction scoring parameters 323, knowledge database 324, and other information 325 stored for access and use by the computer 301.

Memory 310 may include a plurality of modules 315 for performing various functions described herein. The modules 315 generally include program code that is executable by one or more of the processors 305. As shown, modules 315 include user module 311, instruction set module 312, auction module 313, and augmented instruction set module 314.

The modules 315 may also interact with each other and storage system 320 to perform certain functions. For example, user module 311 is configured receiving, at an augmented technical instruction system, a user query for technical instruction comprising a technical problem to solve (e.g., a solution design) from a user device. In some examples, the user module 311 may utilize Input/Output components 340 including user equipment 341 (which may comprise I/O device 103 shown in FIG. 1). In some examples, the user module 311 utilizes an interactive chat based user interface (e.g., chatbot) on a user device, such as I/O device 103, to interact with the user, such as user 101. In some examples, the user module 311 also determines a current user state from state data representing user knowledge and available physical resources (e.g., resources 102). In some embodiments, the user module 311 may determine the current user state by receiving the state data from the user device in response to a query for additional state data from the augmented technical instruction system. For example, user module 311 may ask the user for the technical problem to solve and request that the user identify the available physical resources (e.g., resources 102). The user may also be queried for what resources the user has consulted, the remainder of the design solution the user needs assistance with, etc.

In some examples, the state data representing user knowledge and available physical resources may include information received from the user device in response to the query for additional state data comprising technical information a user has reviewed, information stored at the technical instruction system representing technical information the user has consulted, and information received from the user device in response to the query for additional state data comprising available physical resources. In some examples, the user module may consult stored information representing user knowledge, such as other information 325, to determine what information the user has recently and/or previously reviewed. This information can also help in identifying the technical problem to solve and a remainder of a design solution needed to be completed. The user module 311 may also update this information (the data representing user knowledge) during a current session in order to access it in subsequent sessions if needed. In some examples, the user module 311 is also configured to provide/display the generated augmented technical instructions, described herein, to the user using an interactive chat based user interface (chatbot).

As shown in FIG. 3, the modules 315 also include instruction set module 312. In some examples, the instruction set module 312 is configured to identify a technical instruction set, such as standard technical instruction set 202, from the user query and the current user state. For example, the instruction set module 312 may be configured to parse, using a natural language processing engine, the technical problem to solve from the user query. In some examples, the technical problem to solve may also be identified from stored data such as other information 325.

For example, the instruction set module 312 may determine from the various user input and the knowledge database 324 that a cloud ontology (such as knowledge database 324) that, a distributed application based on a business layer is often backed up by a database layer, the instruction set module 312 may also determine that in a cloud installation template (pattern) that a database is a part of the overall dependency tree for the distributed application. In some examples, the user query (the technical problem to solve) includes an entity that is a distributed application based on the business layer in a web based application server. In one example, the instruction set module 312 may determine that the web based application server has not yet been included in the design solution as seen in information provided by the user (even if the user may have mentioned it in its interaction with the system 110). In another example, the instruction set module 312 may determine that the query of the user uses the generic term "web application based business layer" or some form of thereof, in this case, the module 312 will identify that mentioning a database (which has not yet been accounted into the design solution) is meaningful, and identify that, given a certain piece of technology already in the design, only a web based application server or a similar alternative are feasible to implement in the web layer. In these examples, the instruction set module 312 then accesses examples and user instruction manuals stored in technical instruction sets 321 that can provide the generic or preliminary missing information for implementing the web based application server in the deployment of the distributed application.

As described in the previous example, the instruction set module 312 also determines from the current user state, a current status of a solution state for the technical problem, and selects from a set of stored solutions the technical instruction set, such as technical instruction sets 321, wherein the technical instruction set provides a preliminary or basic solution for the technical problem. For example, the technical instruction set may be a standard instruction set 200 described in relation to FIG. 2A and also provide a basic and/or generic design solution for the technical problem (e.g., standard solutions to implement a web based application server). In one example, instruction set module 312, using the state of the current solution (what has already been put into the design), the user intent derived from the user query (e.g., "Will Websphere work?" or "What web business logic software should I use?"), the overall solution goal, and the availability of examples of what remains (by matching the current state with the known software stack pattern/template etc. from the knowledge database 324), the instruction set module 312 identifies the remainder of the technical problem (i.e., the design solution that the user needs to implement) in an abstract sense ("database, business logic layer"). In one example, the content that is stored in the knowledge database 324, may be previously sourced from solution providers (where these solution providers may be identified as the subset of solution providers to solicit for solution bids to form the augmented instructions set).

As shown in FIG. 3, the modules 315 also include auction module 313. In some examples, the auction module 313 is configured to conduct a knowledge augmentation auction. For example, the auction module 313 is configured to identify a subset of solution providers for a bidding process using the technical instruction set. For example, the auction module 313 may identify a subset of solution providers 371, using a set of attributes about the solution providers 322, where the subset is identified from the solution providers 370 that may have relevant solution to segment the technical instruction set. For example, the solution provider that may have solution related a web based application server and/or implementing the distributed application. In some examples, the auction module 313 may identify the subset of solution providers 371 by identifying a set of solution providers related to the technical problem to solve, and determining the subset of solution providers from the set of identified solution providers. In some examples, the subset of solution providers includes solution providers having a set of solutions in a solution database related to the technical problem to solve, this information may be stored in solution providers 322. In some examples, the auction module 313 may open the auction to any solution provider that would like to supply a solution bid such that the subset is not limiting.

In some examples, the solution providers and/or subset of solution providers that provide a solution bid must be subscribed to an auction service in order to provide the solution bid and/or provide a payment for each solution bid provided to the auction module 313. For example, the solution providers 120 may pay a subscription fee to be subscribed to system 110 in order to provide solution bids during knowledge augmentation auctions. In some examples, the solution providers 120 may pay a fee for each solution bid provided to system 110 and/or solution providers 120 may pay a fee for each solution bid provided that wins an augmentation auction.

The auction module 313 further solicits solution bids from the subset of solution providers 371 by providing the current user state and the technical problem to solve to the subset of solution providers 371, using the network interface 330 and network 360. Soliciting solution bids may also include providing the determined available physical resources, the current state of the user, and the technical problem to solve to the subset of solution providers 371.

The auction module continues the knowledge augmentation auction by receiving one or more solution bids, such as one or more solution bids 210, from the subset of solution providers via the network interface 330, wherein the solution bids comprise technical instructions, examples, and visual solution to augment the technical instruction set. In some examples, the solution bids may also include a list of preferred physical resources. The auction module 313 may use the preferred physical resources such that the solution bid score, described herein, is further based on a similarity of preferred physical resources in the list and the available physical resources 102.

The auction module 313 then determines a solution bid score for each of the one or more solution bids, where the solution bid score grades the solution bid based on a relevance score of the solution bid to the technical instruction set and based on a quality score of the solution bid. In some examples, the solution bid score uses the auction scoring parameters 323 in order to grade the solution bids. The auction module 313 then determines a winning solution bid from the scored solution bids, wherein the winning solution bid comprises the solution bid with a highest solution bid score. In some examples, the parameters used to determine a solution bid score may include charges for the solution bid, and relevancy of the solution bid. In some examples, relevancy is measured by the richness of the solution such as more in-depth or illustrative diagrams and examples included in the solution bid. In some examples, the solution bids are scored according to a service level agreement (SLA) between the operator of the system and the solution providers. For example, the SLA may include scoring guidelines for each solution bid.

As shown in FIG. 3, the modules 315 also include augmented instruction set module 314. The augmented instruction set module 314, in some examples, generates the augmented technical instruction set (e.g., augmented technical instruction set 230) by combining the technical instruction set with the technical instructions, examples, and visual solution of the winning solution bid. For example, standard technical instruction set 200 may comprise a generic implementation for implementing a distributed application in a cloud based environment. If the winning solution bid is from a given provider and/or includes a given provider's implementations the generic implementation will be augmented with concrete examples from the winning solution bid such as implementing the given provider's web based application server, database, and cloud disk solution.

Figure 4:
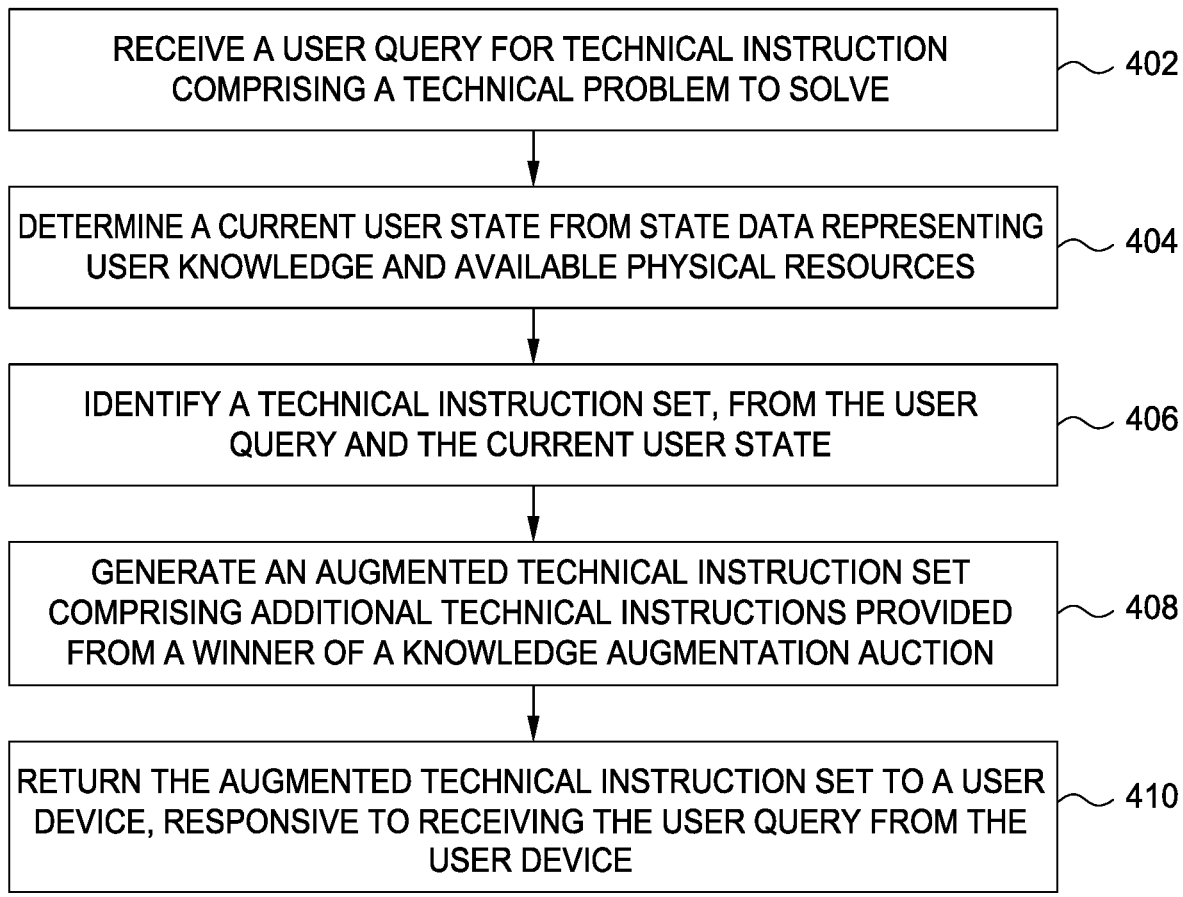
FIG. 4 illustrates a method to provide augmented technical instructions, according to one embodiment described herein.

FIG. 4 illustrates a method to provide augmented technical instructions, according to one embodiment. As shown in FIG. 4, method 400 begins at block 402 where system 110 embodied as computer 301 receives a user query for technical instruction comprising a technical problem to solve. The method 400 continues at block 404, where the system 110 determines a current user state from state data representing user knowledge and available physical resources. At block 406, system 110 identifies a technical instruction set, from the user query and the current user state, and at block 408 the system 110 generates an augmented technical instruction set comprising additional technical instructions provided from a winner of a knowledge augmentation auction. Method 400 continues to block 410 where system 110 provides the augmented technical instruction set to a user through a user device in response to receiving the user query from the user device.

Figure 5:
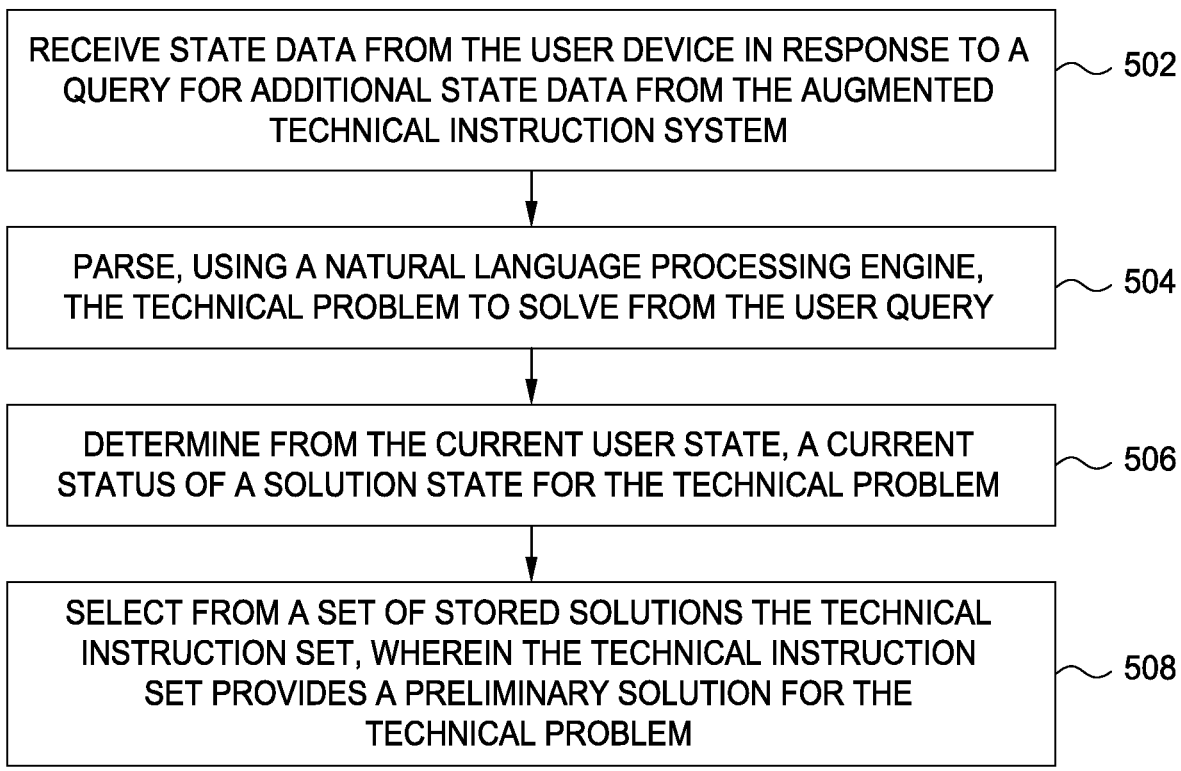
FIGS. 5-8 illustrate additional methods to provide augmented technical instructions, according to one embodiment described herein.

FIG. 5 illustrates an additional method to provide augmented technical instructions. As shown in FIG. 5, method 500 begins at block 502 where system 110 embodied as computer 301 receives state data from the user device in response to a query for additional state data from the augmented technical instruction system. The method 500 continues at block 504, where the system 110 parses, using a natural language processing engine, the technical problem to solve from the user query. At block 506, system 110 determines from the current user state, a current status of a solution state for the technical problem, and at block 508 the system 110 selects from a set of stored solutions the technical instruction set, wherein the technical instruction set provides a preliminary solution for the technical problem.

Figure 6:
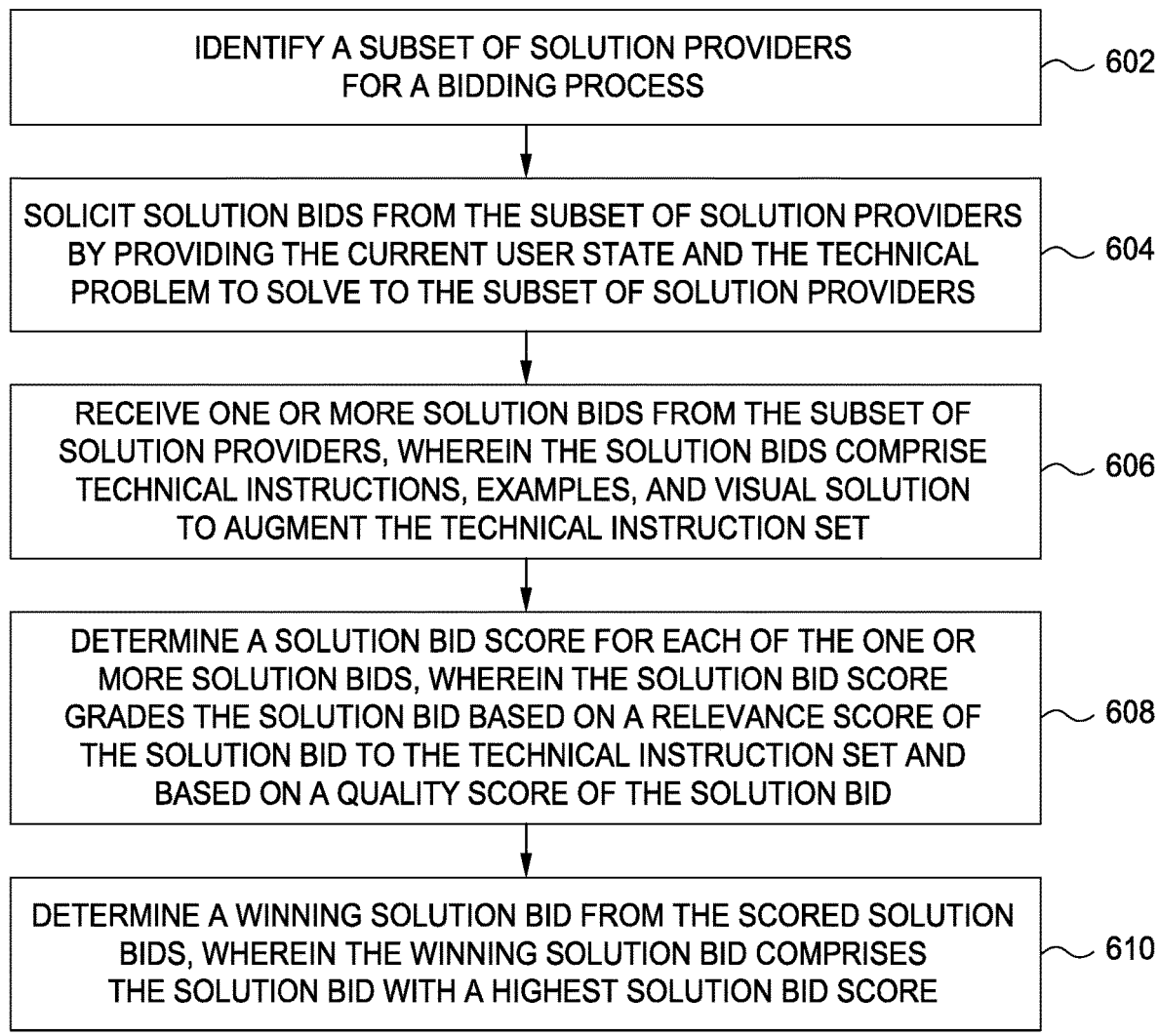

FIG. 6 illustrates an additional method to provide augmented technical instructions. As shown in FIG. 6, method 600 begins at block 602 where system 110 embodied as computer 301 identifies a subset of solution providers for a bidding process. The method 600 continues at block 604, where the system 110 solicits solution bids from the subset of solution providers by providing the current user state and the technical problem to solve to the subset of solution providers. At block 606, system 110 receives one or more solution bids from the subset of solution providers, wherein the solution bids comprise technical instructions, examples, and visual solution to augment the technical instruction set, and at block 608 the system 110 determines a solution bid score for each of the one or more solution bids, wherein the solution bid score grades the solution bid based on a relevance score of the solution bid to the technical instruction set and based on a quality score of the solution bid. Method 600 continues to block 610 where system 110 determines a winning solution bid from the scored solution bids, wherein the winning solution bid comprises the solution bid with a highest solution bid score.

Figure 7:
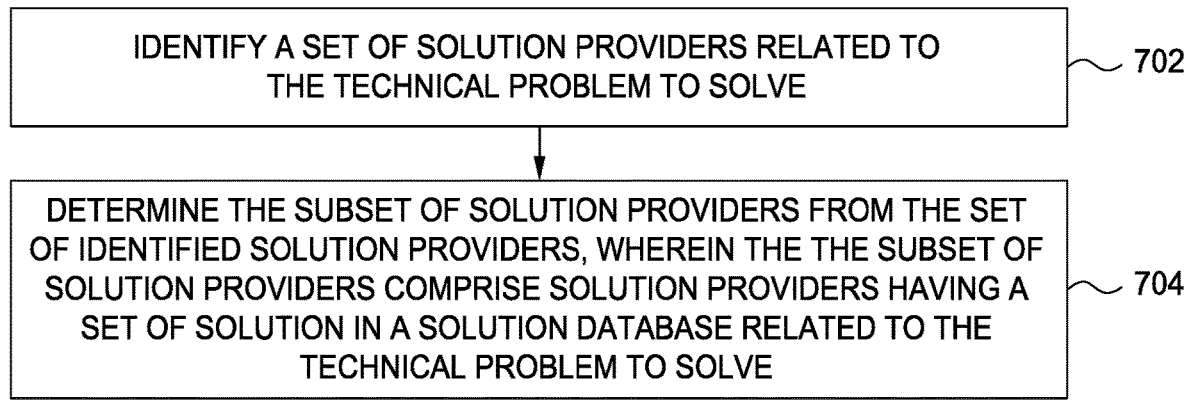

FIG. 7 illustrates an additional method to provide augmented technical instructions. As shown in FIG. 7, method 700 begins at block 702 where system 110 embodied as computer 301 identifies a set of solution providers related to the technical problem to solve. The method 700 continues at block 704, where the system 110 determines the subset of solution providers from the set of identified solution providers, wherein the subset of solution providers comprise solution providers having a set of solutions in a solution database related to the technical problem to solve. In some examples, the subset of solution providers further comprise solution providers subscribed to provide solution bids, such as solution providers that have paid a monetary fee to provider solution bids.

Figure 8:
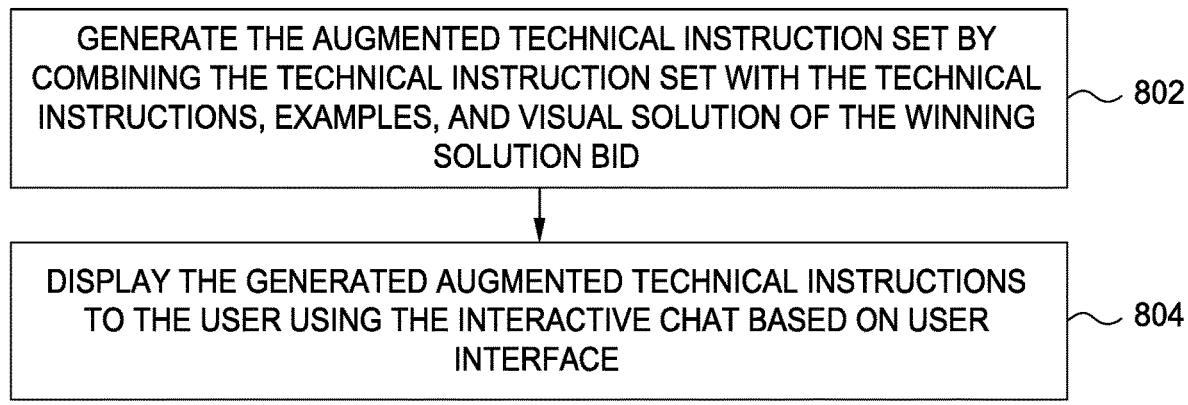

FIG. 8 illustrates an additional method to provide augmented technical instructions. As shown in FIG. 8, method 800 begins at block 802 where system 110 embodied as computer 301 generates the augmented technical instruction set by combining the technical instruction set with the technical instructions, examples, and visual solution of the winning solution bid. The method 800 continues at block 804, where the system 110 displays the generated augmented technical instructions to the user using the interactive chat based user interface.

Figure 9:
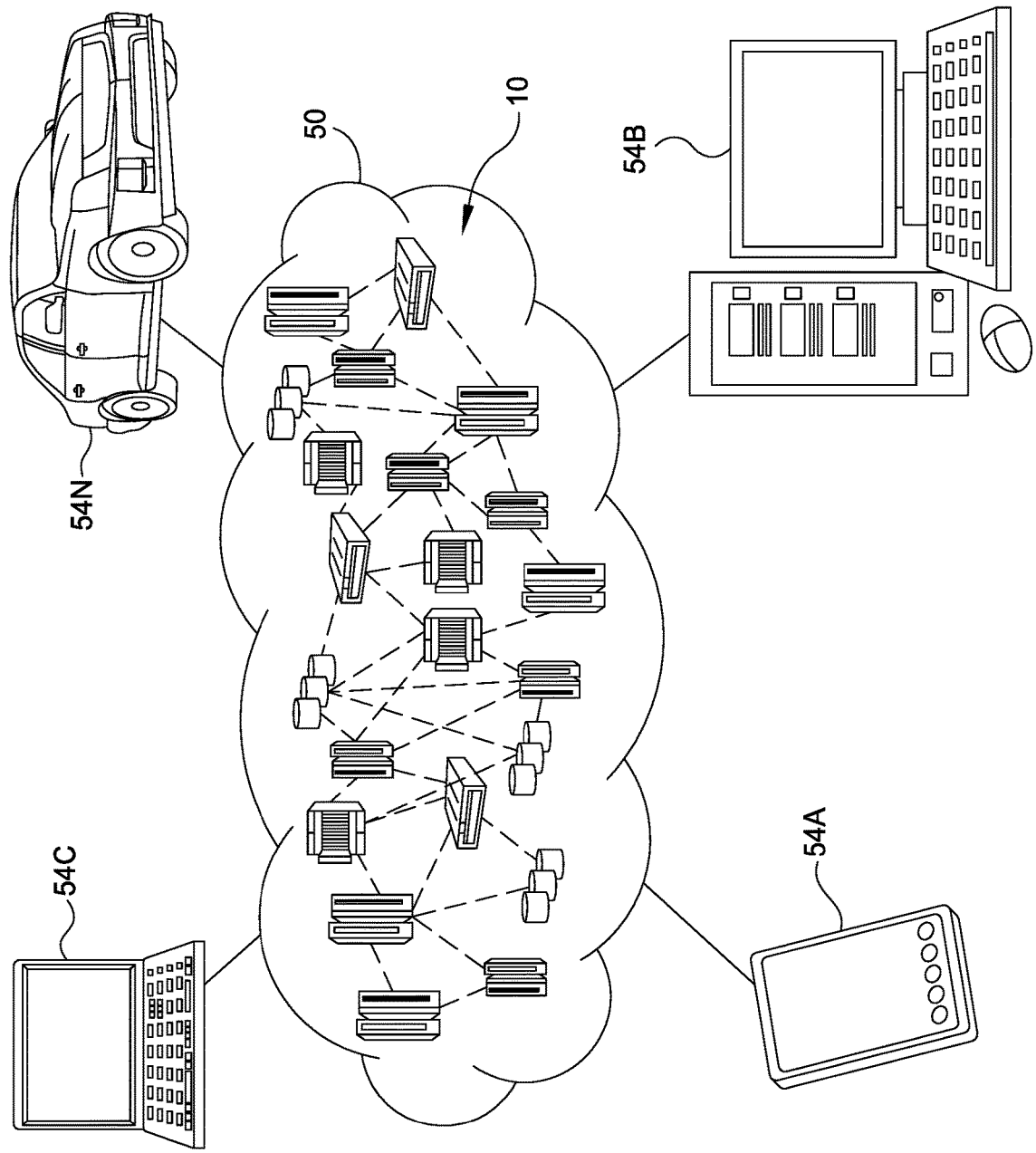
FIG. 9 depicts a cloud computing environment, according to one embodiment described herein.
Figure 10:
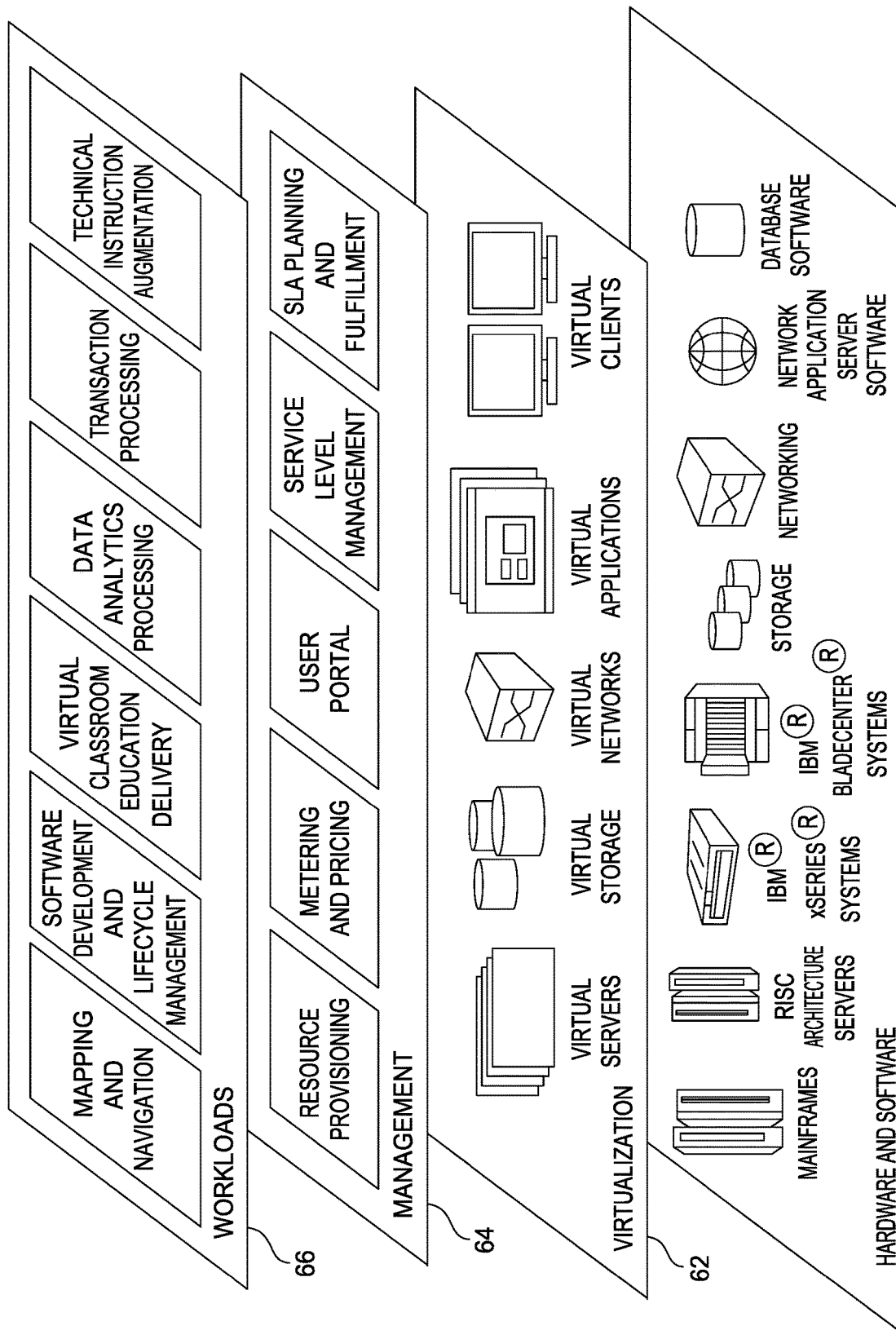
FIG. 10 depicts abstraction model layers, according to one embodiment described herein.

Turning now to FIGS. 9 and 10. It is understood in advance that although this disclosure includes a detailed description on cloud computing, implementation of the teachings recited herein are not limited to a cloud computing environment. Rather, embodiments described herein are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring back to FIG. 3, computer 301 may comprise a cloud computing node. In this example, computer 301 embodied as a cloud computing node is only one example of a suitable cloud computing node and is not intended to suggest any limitation as to the scope of use or functionality of embodiments described herein. Regardless, computer 301 embodied as a cloud computing node is capable of being implemented and/or performing any of the functionality set forth hereinabove.

Referring now to FIG. 9, illustrative cloud computing environment 50 is depicted. As shown, cloud computing environment 50 comprises one or more cloud computing nodes 10, which may be embodied as computer 301 described in relation to FIG. 3, with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments described herein are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and augmentation of technical instructions as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at an augmented technical instruction system, a user query for technical instruction comprising a technical problem to solve from a user device;
determining a current user state from state data received at the augmented technical instruction system, the state data representing user knowledge, available physical resources, and the user device, wherein the available physical resources comprise at least one hardware component separate from the user device, wherein the available physical resources are physically available to a user for use when performing a technical instruction set;
identifying a technical instruction set, from the user query and the current user state;
generating, at the augmented technical instruction system, an augmented technical instruction set comprising additional technical instructions provided from a winner of a knowledge augmentation auction; and
returning the augmented technical instruction set to the user device, responsive to receiving the user query from the user device.

2. The method of claim 1, wherein determining the current user state further comprises:
receiving the state data from the user device in response to a query for additional state data from the augmented technical instruction system, wherein the state data comprises:
information received from the user device in response to the query for additional state data comprising technical information a user has reviewed;
information stored at the technical instruction system representing technical information the user has consulted; and
information received from the user device in response to the query for additional state data comprising available physical resources.

3. The method of claim 1, wherein identifying the technical instruction set from the user query and the current user state comprises:
parsing, using a natural language processing engine, the technical problem to solve from the user query;
determining from the current user state, a current status of a solution state for the technical problem; and
selecting from a set of stored solutions the technical instruction set, wherein the technical instruction set provides a preliminary solution for the technical problem.

4. The method of claim 1, further comprising conducting the knowledge augmentation auction by:
using the technical instruction set, identifying a subset of solution providers for a bidding process;
soliciting solution bids from the subset of solution providers by providing the current user state and the technical problem to solve to the subset of solution providers;
receiving one or more solution bids from the subset of solution providers, wherein the solution bids comprise technical instructions, examples, and visual solution to augment the technical instruction set;
determining a solution bid score for each of the one or more solution bids, wherein the solution bid score grades the solution bid based on a relevance score of the solution bid to the technical instruction set and based on a quality score of the solution bid; and
determining a winning solution bid from the scored solution bids, wherein the winning solution bid comprises the solution bid with a highest solution bid score.

5. The method of claim 4, wherein identifying the subset of solution providers for the bidding process comprises:
identifying a set of solution providers related to the technical problem to solve; and
determining the subset of solution providers from the set of identified solution providers, wherein the subset of solution providers comprise solution providers having a set of solution in a solution database related to the technical problem to solve, wherein the subset of solution providers further comprise solution providers subscribed to provide solution bids.

6. The method of claim 4, wherein soliciting solution bids from the subset of solution providers further comprises providing the available physical resources to the subset of solution providers;
   wherein the solution bid from the subset of solution providers further comprises a list of preferred physical resources; and
   wherein the solution bid score is further based on a similarity of preferred physical resources in the list and the available physical resources.

7. The method of claim 4, wherein an interactive chat based user interface is provided to the user and wherein providing the augmented technical instruction set to the user comprises:
   generating the augmented technical instruction set by combining the technical instruction set with the technical instructions, examples, and visual solution of the winning solution bid; and
   displaying the generated augmented technical instructions to the user using the interactive chat based user interface.

8. A system comprising:
   one or more computer processors; and
   a memory containing a program which when executed by the processors performs an operation comprising:
      receiving, at an augmented technical instruction system, a user query for technical instruction comprising a technical problem to solve from a user device;
      determining a current user state from state data received at the augmented technical instruction system, the state data representing user knowledge, available physical resources, and the user device, wherein the available physical resources comprise at least one hardware component separate from the user device, wherein the available physical resources are physically available to a user for use when performing a technical instruction set;
      identifying a technical instruction set, from the user query and the current user state;
      generating, at the augmented technical instruction system, an augmented technical instruction set comprising additional technical instructions provided from a winner of a knowledge augmentation auction; and
      returning the augmented technical instruction set to the user device, responsive to receiving the user query from the user device.

9. The system of claim 8, wherein determining the current user state further comprises:
   receiving the state data from the user device in response to a query for additional state data from the augmented technical instruction system, wherein the state data comprises:
      information received from the user device in response to the query for additional state data comprising technical information a user has reviewed;
      information stored at the technical instruction system representing technical information the user has consulted; and
      information received from the user device in response to the query for additional state data comprising available physical resources.

10. The system of claim 8, wherein identifying the technical instruction set from the user query and the current user state comprises:
   parsing, using a natural language processing engine, the technical problem to solve from the user query;
   determining from the current user state, a current status of a solution state for the technical problem; and
   selecting from a set of stored solutions the technical instruction set, wherein the technical instruction set provides a preliminary solution for the technical problem.

11. The system of claim 8, further comprising conducting the knowledge augmentation auction by:
   using the technical instruction set, identifying a subset of solution providers for a bidding process;
   soliciting solution bids from the subset of solution providers by providing the current user state and the technical problem to solve to the subset of solution providers;
   receiving one or more solution bids from the subset of solution providers, wherein the solution bids comprise technical instructions, examples, and visual solution to augment the technical instruction set;
   determining a solution bid score for each of the one or more solution bids, wherein the solution bid score grades the solution bid based on a relevance score of the solution bid to the technical instruction set and based on a quality score of the solution bid; and
   determining a winning solution bid from the scored solution bids, wherein the winning solution bid comprises the solution bid with a highest solution bid score.

12. The system of claim 11, wherein identifying the subset of solution providers for the bidding process comprises:
   identifying a set of solution providers related to the technical problem to solve; and
   determining the subset of solution providers from the set of identified solution providers, wherein the subset of solution providers comprise solution providers having a set of solution in a solution database related to the technical problem to solve, wherein the subset of solution providers further comprise solution providers subscribed to provide solution bids.

13. The system of claim 11, wherein soliciting solution bids from the subset of solution providers further comprises providing the available physical resources to the subset of solution providers;
   wherein the solution bid from the subset of solution providers further comprises a list of preferred physical resources; and
   wherein the solution bid score is further based on a similarity of preferred physical resources in the list and the available physical resources.

14. The system of claim 11, wherein an interactive chat based user interface is provided to the user and wherein providing the augmented technical instruction set to the user comprises:
   generating the augmented technical instruction set by combining the technical instruction set with the technical instructions, examples, and visual solution of the winning solution bid; and
   displaying the generated augmented technical instructions to the user using the interactive chat based user interface.

15. A computer program product comprising:
   a computer-readable storage medium having computer-readable program code embodied therewith, the computer-readable program code executable by one or more computer processors to perform an operation, the operation comprising:
      receiving, at an augmented technical instruction system, a user query for technical instruction comprising a technical problem to solve from a user device;

determining a current user state from state data received at the augmented technical instruction system, the state data representing user knowledge, available physical resources, and the user device, wherein the available physical resources comprise at least one hardware component separate from the user device, wherein the available physical resources are physically available to a user for use when performing a technical instruction set;

identifying a technical instruction set, from the user query and the current user state;

generating, at the augmented technical instruction system, an augmented technical instruction set comprising additional technical instructions provided from a winner of a knowledge augmentation auction; and returning the augmented technical instruction set to the user device, responsive to receiving the user query from the user device.

16. The computer program product of claim 15, wherein determining the current user state further comprises:

receiving the state data from the user device in response to a query for additional state data from the augmented technical instruction system, wherein the state data comprises:

information received from the user device in response to the query for additional state data comprising technical information a user has reviewed;

information stored at the technical instruction system representing technical information the user has consulted; and information received from the user device in response to the query for additional state data comprising available physical resources.

17. The computer program product of claim 15, wherein identifying the technical instruction set from the user query and the current user state comprises:

parsing, using a natural language processing engine, the technical problem to solve from the user query;

determining from the current user state, a current status of a solution state for the technical problem; and selecting from a set of stored solutions the technical instruction set, wherein the technical instruction set provides a preliminary solution for the technical problem.

18. The computer program product of claim 15, further comprising conducting the knowledge augmentation auction by:

using the technical instruction set, identifying a subset of solution providers for a bidding process;

soliciting solution bids from the subset of solution providers by providing the current user state and the technical problem to solve to the subset of solution providers;

receiving one or more solution bids from the subset of solution providers, wherein the solution bids comprise technical instructions, examples, and visual solution to augment the technical instruction set;

determining a solution bid score for each of the one or more solution bids, wherein the solution bid score grades the solution bid based on a relevance score of the solution bid to the technical instruction set and based on a quality score of the solution bid; and determining a winning solution bid from the scored solution bids, wherein the winning solution bid comprises the solution bid with a highest solution bid score.

19. The computer program product of claim 18, wherein identifying the subset of solution providers for the bidding process comprises:

identifying a set of solution providers related to the technical problem to solve; and determining the subset of solution providers from the set of identified solution providers, wherein the subset of solution providers comprise solution providers having a set of solution in a solution database related to the technical problem to solve, wherein the subset of solution providers further comprise solution providers subscribed to provide solution bids; and wherein soliciting solution bids from the subset of solution providers further comprises:

providing the available physical resources to the subset of solution providers;

wherein the solution bid from the subset of solution providers further comprises a list of preferred physical resources; and wherein the solution bid score is further based on a similarity of preferred physical resources in the list and the available physical resources.

20. The computer program product of claim 18, wherein an interactive chat based user interface is provided to the user and wherein providing the augmented technical instruction set to the user comprises:

generating the augmented technical instruction set by combining the technical instruction set with the technical instructions, examples, and visual solution of the winning solution bid; and displaying the generated augmented technical instructions to the user using the interactive chat based user interface.

* * * * *